United States Patent [19]

Stolzenbach et al.

[11] 4,409,340

[45] Oct. 11, 1983

[54] HEAT-CURABLE COATING COMPOSITION, ITS USE AND PROCESS FOR COATING SUBSTRATES

[75] Inventors: Heinrich Stolzenbach; Rudolf Heitzmann; Siegfried Heinrich, all of Wuppertal, Fed. Rep. of Germany

[73] Assignee: Herberts GmbH, Wuppertal, Fed. Rep. of Germany

[21] Appl. No.: 353,061

[22] Filed: Mar. 1, 1982

[30] Foreign Application Priority Data

Mar. 10, 1981 [DE] Fed. Rep. of Germany ....... 3108953

[51] Int. Cl.³ .............................................. C08G 18/14
[52] U.S. Cl. ................................. 521/159; 427/385.5; 427/388.1; 427/388.2; 428/423.1; 428/425.8; 524/590; 524/874; 528/45
[58] Field of Search .......................... 521/159; 528/45; 524/590, 874; 427/385.5, 388.1, 388.2; 428/423.1, 425.8

[56] References Cited

U.S. PATENT DOCUMENTS 4,248,756 2/1981 König et al. ........................... 528/64
4,299,868 11/1981 Berndt et al. ........................ 524/591

*Primary Examiner*—Maurice J. Welsh
*Attorney, Agent, or Firm*—Mandeville and Schweitzer

[57] ABSTRACT

The invention relates to a heat-curable coating composition, comprising:
(A) a prepolymer with ketoxime-blocked NCO groups, which are linked to the prepolymer via cycloaliphatic and/or aliphatic groups,
(B) a diamine cross linker,
(C) organic solvents in an amount of 0 to 50 weight percent, based on the total weight of the coating composition,
(D) optionally pigments, fillers, blowing agents and other known additives.

The equivalence ratio of blocked NCO groups of component (A) to $NH_2$ groups of component (B) lies between 1.3:1 and 0.75:1. The invention also relates to processes for its application and its use. The composition has a long shelf life and is advantageously used as an impact resistive coating on metal substrates such as automobile parts.

19 Claims, No Drawings

HEAT-CURABLE COATING COMPOSITION, ITS USE AND PROCESS FOR COATING SUBSTRATES

BACKGROUND OF THE PRESENT INVENTION

The present invention relates to a heat-curable coating composition based on prepolymers having ketoxime-blocked NCO groups and cross linkers from the group of particular amines. In particular, the present invention relates to the use of such coating compositions, defined in detail in the following, for producing protective coatings on substrates, especially metal parts. This protective layer may be present alone or as a component of a paint system of several layers.

Coating compositions consisting of prepolymers with at least 2 blocked isocyanate groups and an average molecular weight of between 500 and 25,000, aliphatic and/or cycloaliphatic and/or aromatic amines with at least 2 primary and/or secondary amino groups, stable aqueous polymer dispersions and/or polymer solutions, as well as optionally organic solvents, are known (German Offenlegungsschrift No. 2,184,079). Such coating composition are used preferably for coating nonwoven textile fabrics. This is also the case for heat-curable coating compositions, which are known from the German Offenlegungsschrift No. 2,902,090 and which contain prepolymers having ketoxime-blocked NCO groups and an average molecular weight of 1,000 to 15,000, a cross linker of the formula

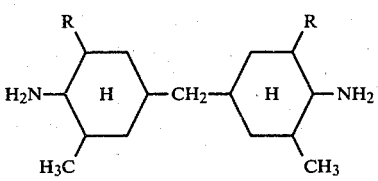

in which R represents hydrogen or a methyl group, as well as optionally gigments, fillers, blowing agents and other known additives.

These known coating compositions have the disadvantage that either they are not very reactive, that is, they require a high baking temperature, or, when they are highly reactive, they have an unsatisfactory shelf life.

DESCRIPTION OF THE INVENTION

It is therefore an object of the present invention to provide a heat-curable coating composition, which has a long shelf life and, at the same time, is highly reactive, that is, which can be cured, after the substrate is coated, at relatively low baking temperatures.

Surprisingly, it was discovered that this objective can be accomplished if the coating composition contains the components defined below.

The object of the present invention accordingly is a heat-curable coating composition containing (A) a prepolymer with an average molecular weight of 500 to 15,000, which contains on the average 2 to 6 ketoxime-blocked NCO groups, which are linked via cycloaliphatic and/or aliphatic groups to the prepolymer, (B) a cross linker from the group of amines having the formula

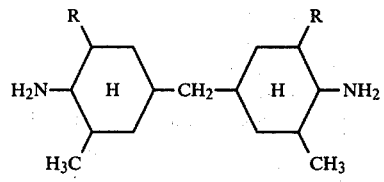

in which R represents hydrogen or a methyl group, 3(4),8(9)-bis(aminomethyl)-tricyclo[5.2.1.0.$^{2,6}$]-decane

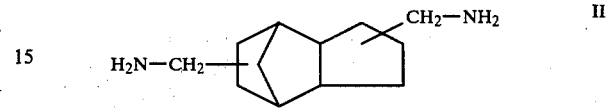

N,N'-bisaminopropyl-dimethyl-hydantoin and

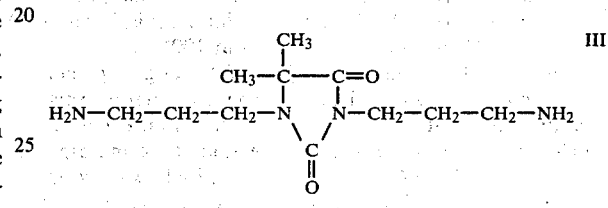

(C) organic solvents in an amount of 0 to 50 weight percent based on the total weight of the coating composition, (D) optionally pigments, fillers, blowing agents and other known additives the equivalent ratio of blocked NCO groups of component (A) to $NH_2$ groups of component (B) lying between 1.3:1 and 0.75:1.

As amines of formula I, preferably those are used in which R represents hydrogen.

Suitable cycloaliphatic and/or aliphatic, NCO group-containing polyisocyanates of the type used for the synthesis of prepolymers, are 3-isocyanatomethyl-3,5,5-trimethylcyclohexylisocyanate (IPDI), 4,4'-diisocyanatodicyclohexylmethane (Desmodur W$^{(R)}$), hexamethylene diisocyanate (HDI), biuret group-containing, trimerized HDI (Desmodur N$^{(R)}$), and trimethylenehexamethylene diisocyanate. It is obvious to those skilled in the art that this list is not complete and that there are still other, especially conventional commercial isocyanates and similar isocyanates available.

These polyisocyanates are reacted with polyhydroxyl compounds, which contain 2 to 6 and preferably 2 or 3 hydroxyl groups and have a molecular weight of 62 (glycol) to about 5,000. The lower limit for the molecular weight preferably lies at about 100 and particularly at about 500, while the upper limit preferably lies at about 4,000 and particularly at about 3,000. Such polyhydroxyl compounds, which are particularly suitable, are, for example, ethylene glycol and its homologues, polypropyleneglycol with $\overline{M}$=134 to 5,000, polyethyleneglycol with $\overline{M}$=106 to 5,000, polyethyleneoxides and polypropyleneoxides started with multihydric alcohols, such as for example, neopentyl glycol, trimethylolpropane, glycerin, sorbitol, etc., and polyesters as described in "Lackkunstharze" (Synthetic Paint Resins) of Wagner, Sarx, 1971, Chapter 2.5, pages 86–147, as well as their combinations.

Further examples of polyhydroxyl compounds are polyurethanes, which may be obtained by reacting any polyisocyanates with polyols in such a quantitative ratio, that there are no free isocyanate groups in the reaction product, but that these groups are reacted completely into the reaction product. These polyurethanes therefore contain only hydroxyl groups as reactive groups. The polyisocyanates, reacted into these polyurethanes, may be aromatic, aliphatic and/or cycloaliphatic polyisocyanates. Mixtures of different polyhydroxyl compounds may of course be also used as the inventive polyhydroxyl compounds. These are then reacted as described above with the polyisocyanates, having cycloaliphatic and/or aliphatic NCO groups, in order to synthesize prepolymer (A).

The synthesis of the prepolymers, which contain free NCO groups, is accomplished by known procedures by reacting the polyisocyanates with the polyhydroxyl compounds at an elevated temperature and, if necessary, with the addition of suitable catalysts. The temperatures appropriately are at least about 50° C. and preferably at least about 75° C. The upper limit advisably is at about 120° C. and preferably at about 100° C.

The ratio between the number of NCO groups and the number of hydroxyl groups can vary within relatively wide limits, provided that there is an excess of NCO groups. Preferably, there are at least 1.4 and especially at least 1.6 NCO groups for each hydroxyl group. The upper limit advisably is at 3 and preferably at 2.5 and, under certain conditions, at 2 NCO groups per hydroxyl group.

The reaction between polyisocyanate and polyhydroxyl compounds is carried out, until a prepolymer with the desired NCO number is obtained. The NCO number is defined in DIN No. 53 185.

As already explained, the prepolymers have 2 to 6 NCO groups per molecule. Especially preferred are 2 to 4 and particularly 2 to 3 NCO groups per molecule.

The prepolymers, which are so obtained and have free NCO groups, are blocked by known procedures with ketoximes, the oximes of butanone, propanone and cyclohexanone being advisably used as ketoximes. Butanone oxime is especially preferred. The amount of ketoxime, used for blocking, is stoichiometric to the amount of NCO groups to be blocked. A slight excess of ketoxime is appropriate, in order to ensure a complete reaction. Advisably, the excess is not more than 20 mole percent and preferably not more than 10 mole percent. As is known from the state of the art, blocking is accomplished at elevated temperatures of appropiately at least 50° C. and preferably of at least 70° C. and advisably of at most 120° C. and preferably of at most 100° C.

The molecular weight of the blocked prepolymer advisably is at least 800 and preferably at least 1,000. The upper limit advisably is about 10,000 and preferably about 5,000.

The prepolymers can be dissolved in suitable organic solvents, especially if they have a high viscosity or are solid at room temperature. Naturally, only such solvents can be used which are chemically inert towards the prepolymers and the cross linkers. Examples are esters, for example, ethyl acetate, butyl acetate, etc., glycol ether esters, for example, methylglycol acetate, ethylglycol acetate, etc., ketones, for example, butanone, cyclohexanone, etc., terpene hydrocarbons, for example, Depanol N IV$^{(R)}$, etc., and aromatic hydrocarbons, for example, xylene, toluene, etc.

The amount of solvent is so selected that, when mixed with the other components, the organic solvent is not present in an amount in excess of 40 weight percent and preferably not in an amount in excess of 30 weight percent, based on the total weight of the heat-curable coating composition.

The ratio between the blocked prepolymer, that is, component A, and the cross linker, that is, the diamine of component B, advisably is approximately equivalent. However, a slight excess of one or the other component may also be used, the upper limit for the respective excess advisably not being greater than 20 equivalent percent, preferably not greater than 10 equivalent percent and particularly not greater than 5 equivalent percent.

The coating compositions may optionally contain pigments, fillers, blowing agents and other conventional known paint additives, e.g. plasticizers.

The object of the invention furthermore is a process for coating substrates, which is characterized by the fact that the substrates are coated with the above-defined heat-curable coating compositions and then cured. The curing can be accomplished by known procedures by the action of heat or infrared radiation. If necessary, in order to accelerate the reaction, conventional catalysts may be added, such as organic tin compounds, tertiary amines, organic titanates, organic zinc compounds, Lewis acids, for example, boron trifluoride etherate, and quaternary ammonium salts.

As already explained above, the inventively used coating compositions have the exceptional advantage that they cure relatively rapidly at low temperatures and, on the other hand, still have a long shelf life. Curing can advisably be accomplished at object temperatures of 100° to 200° C. The upper limit advisably is at about 180° C. and preferably at about 160° C. As a rule, the temperature should be higher than 120° C. and preferably higher than 130° C.

Binder systems, based on blocked isocyanate and amine cross linkers of the state of the art and having such a high reactivity, do not have a sufficiently long shelf life, that is, their viscosity increases greatly with storage time. On the other hand, the inventive coating compositions have a very long shelf life, so that essentially no viscosity changes can be observed after a 4-week storage at room temperature.

According to an especially preferred embodiment, the inventive coating composition is used for producing stone-impact protective layers on motor vehicles. For such protective layers, the coating composition then contains conventional fillers, pigments, and other additives of the type already partially referred to above. The stone-impact protective layers generally are applied as relatively thick layers of 30 $\mu$m to 3 mm and it is therefore advisable that the coating materials contain thixotropic materials and thickening agents in order to prevent their running down vertical surfaces.

In many cases, the stone-impact protective layer is one layer of a paint system of several layers. It is a particular advantage of the present invention that a further, known paint layer can be applied on the inventive stone-impact protective layer and that this additional layer can be cured together with the stone-impact protective layer in one processing step.

The invention is explained by means of the following examples.

RESIN SOLUTION A

A polypropyleneglycol (1,500 g, $\overline{M}$ approximately 1,000 g/mole) is mixed with 89 g of a polypropylenetriol ($\overline{M}$ approximately 500 g/mole) and reacted at 80°

C. with 734 g of 4,4'-diisocyanatodicyclohexylmethane. Subsequently the product is capped at 80° C. with 191 g of butanone oxime. The material is dissolved in 80% ethylglycol acetate.

RESIN SOLUTION B

The preparation of this resin solution is based on the following formulation:
 1,154 g of polypropyleneglycol ($\overline{M}$ ca. 1,000 g/mole)
 69 g of polypropylenetriol ($\overline{M}$ ca. 500 g/mole)
 478 g of 3-isocyanatomethyl-3,5,5-trimethylcyclohexylisocyanate
 147 g of butanone oxime The procedure is similar to that for resin solution A.

The resins solutions, so prepared, are used for formulating coating compositions as follows:

EXAMPLE 1

54.0 parts of resin solution A
4.0 of 3,3'-dimethyl-4,4'-diaminodicyclohexylmethane
0.5 of conventional commercial thickeneing agent (highly disperse silica)
0.2 of carbon black
2.0 of titanium dioxide
39.3 of barium sulfate

EXAMPLE 2

Like Example 1, however with equivalent exchange of the cross linker component for 3(4),8(9)-bis-(aminomethyl)-tricyclo-[5.2.1.0$^{2.6}$]-decane.

EXAMPLE 3

54.0 parts of resin solution B
4.9 of N,N'-bisaminopropyl-dimethylhydantoin
0.5 of highly disperse silica
0.2 of carbon black
2.0 of titanium dioxide
38.4 of barium sulfate

EXAMPLE 4

49.7 parts of resin solution A
3.7 of 3,3'-dimethyl-4,4'-diaminocyclohexylmethane
0.5 of conventional commercial thickening agent (montmorillonite)
0.2 parts of carbon black
1.8 of titanium dioxide
36.1 of barium sulfate
8.0 of dibutyl phthalate as plasticizer The pigment portions were dispersed in the other components.

The coating compositions, so obtained, were applied (spraying, brushing, etc.) on steel plate coated with an electro-dipping paint and cured for 30 minutes at 160° C.

The test plates were subjected to a stone-impact test, which is described below. The results are summarized in Table 1.

TABLE 1

| Example | Thickness of Layer μm | Time Min. |
|---|---|---|
| 1 | 300 | 18 |
| 1 | 400 | 70 |
| 2 | 260 | 38 |
| 2 | 360 | 110 |
| 3 | 290 | 20 |
| 3 | 380 | 120 |
| 4 | 360 | 45 |

TABLE 1-continued

| Example | Thickness of Layer μm | Time Min. |
|---|---|---|
| 4 | 400 | 85 |

Description of the Stone Impact Test:

The stone-impact test equipment, frequently used at the present time, is not suitable for testing the stone-impact strength of such highly elastic, thick-layered coatings, since this equipment does not operate continuously and therefore the stone-impact stress is too slight for these coatings. An instrument, similar in construction to that described in "defazet, vol. 32, No. 6, 1978, pages 242–243", was therefore used for testing the inventive coating compositions. The instrument used for the test differed from that described in the following particulars:

a. The instrument operates continuously with 300 to 500 g of stone chippings circulating.
b. Stone chippings are the shot material.
c. Shot output: 1.3 kg of stone chippings per minute.
d. The air pressure is 0.75 bar.
e. The distance from shot pistol to test plate is 20 cm.
f. The angle of the test plate to the direction of the shot is 90°.
g. The area of test plate under load is a circle with a diameter of ca. 5 cm.

The test plates were measured by measuring the time required to expose an area of ca. 1 cm$^2$ of metallic substrate for the first time.

SUMMARY

Heat-curable coating composition, containing
(A) a prepolymer with ketoxime-blocked NCO groups, which are linked to the prepolymer via cycloaliphatic and/or aliphatic groups,
(B) a diamine cross linker.
(C) organic solvents in an amount of 0 to 50 weight percent, based on the total weight of the coating composition,
(D) optionally pigments, fillers, blowing agents and other known additives,
the equivalent ratio of blocked NCO groups of component (A) to NH$_2$ groups of component (B) lying between 1.3:1 and 0.75:1.

We claim:
1. Heat-curable coating composition, consisting essentially of
(A) a prepolymer with an average molecular weight of 500 to 15,000, which includes on the average 2 to 6 ketoxime-blocked NCO groups, which are linked via cycloaliphatic and/or aliphatic groups to the prepolymer,
(B) a cross linker from the group of amines having the formula

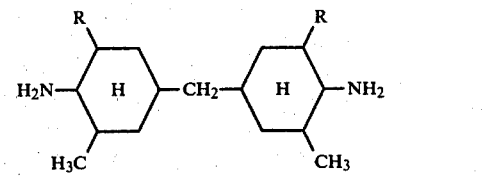

in which R represents hydrogen or a methyl group,

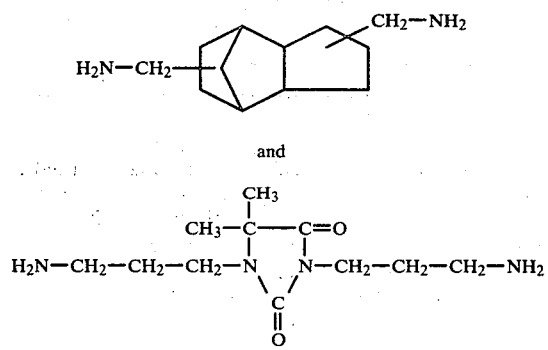

(C) organic solvents in an amount of 0 to 50 weight percent based on the total weight of the coating composition, (D) optionally pigments, fillers, blowing agents and other known additives, the equivalent ratio of blocked NCO groups of component (A) to NH₂ groups of component (B) lying between 1.3:1 and 0.75:1.

2. Coating composition according to claim 1, characterized by the fact that the prepolymer of component (A) is the ketoxime-blocked reaction product of a polyether or a polyester having 2 to 6 hydroxyl groups with an isocyanate containing 2 to 3 isocyanate groups.

3. Process for coating substrates by applying a heat-curable coating composition and curing, characterized by the fact that the coating is carried out with the coating composition of claim 1.

4. Process according to claim 3, characterized by the fact that the coating is a protective layer on motor vehicles as protection against the impact of stones.

5. Process according to claim 4, characterized by the fact that the stone-impact protective layer is a layer of a paint system with several layers.

6. Process according to claim 5, characterized by the fact that a further known coat of paint is applied to the stone-impact protective layer and cured together with the stone-impact protective layer.

7. Process of using the coating composition according to claim 1 for the production of protective coatings on motor vehicles.

8. Process according to claim 7 comprising use of the coating composition for the production of stone-impact protective layers.

9. Process according to claim 8, characterized by the fact that the stone-impact protective layer is a layer of a paint system with several layers.

10. Process according to claim 9, characterized by the fact that a further known coat of paint is applied on the stone-impact protective layer and cured together with the stone-impact protective layer.

11. An impact protective paint comprising a heat-curable coating composition, including (A) a prepolymer with an average molecular weight of 500 to 15,000, which includes on the average 2 to 6 ketoxime-blocked NCO groups, which are linked via cycloaliphatic and/or aliphatic groups to the prepolymer, (B) a cross linker from the group of amines having the formula

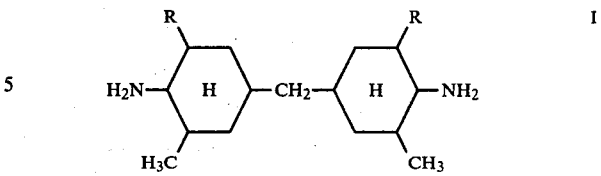

in which R represents hydrogen or a methyl group,

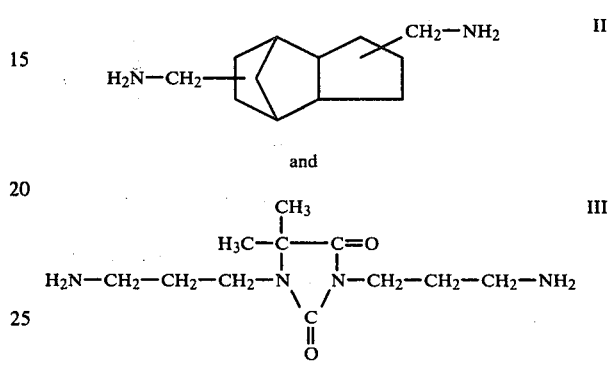

(C) organic solvents in an amount of 0 to 50 weight percent based on the total weight of the coating composition, (D) optionally pigments, fillers, blowing agents and other known additives, the equivalent ratio of blocked NCO groups of component (A) to NH₂ groups of component (B) lying between 1.3:1 and 0.75:1, said heat-curable coating composition comprising one layer of a paint system of several layers.

12. Paint according to claim 11, wherein the coating composition layer and a further paint layer are cured by curing together in one processing step.

13. Paint according to claim 11, wherein the coating composition is cured.

14. Process for coating a protective layer on motor vehicles as protection against the impact of stones which comprise applying a heat-curable coating composition and curing, characterized by the fact that the coating composition includes:

(A) a prepolymer with an average molecular weight of 500 to 15,000, which contains on the average 2 to 6 ketoxime-blocked NCO groups, which are linked via cycloaliphatic and/or aliphatic groups to the prepolymer, (B) a cross linker from the group of amines having the formula

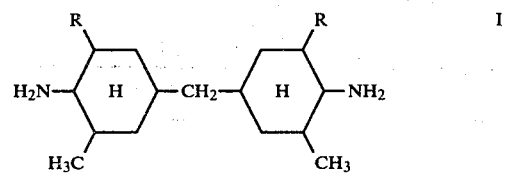

in which R represents hydrogen or a methyl group,

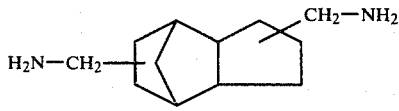

and

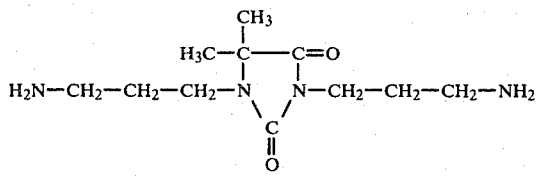 III (C) organic solvents in an amount of 0 to 50 weight percent based on the total weight of the coating composition, (D) optionally pigments, fillers, blowing agents and other known additives, the equivalent ratio of blocked NCO groups of component (A) to $NH_2$ groups of component (B) lying between 1.3:1 and 0.75:1.

15. Process according to claim 14, wherein the stone impact protective layer is a layer of a paint system with several layers.

16. Process according to claim 15, characterized by the fact that a further known coat of paint is applied to the stone impact layer and cured together with the stone impact layer.

17. A metal part protected by an impact resistant paint which comprises a heat-cured coating composition, including the cured product of (A) a prepolymer with an average molecular weight of 500 to 15,000, which includes on the average 2 to 6 ketoxime-blocked NCO groups, which are linked via cycloaliphatic and/or aliphatic groups to the prepolymer, (B) a cross linker from the group of amines having the formula

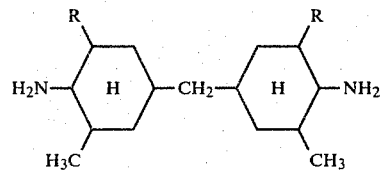 I in which R represents hydrogen or a methyl group,

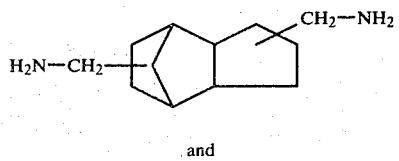 II and

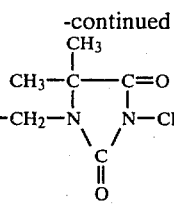
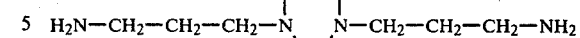
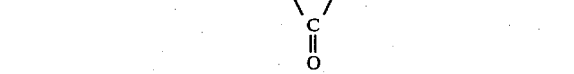

(C) organic solvents in an amount of 0 to 50 weight percent based on the total weight of the coating composition, (D) optionally pigments, fillers, blowing agents and other known additives, the equivalent ratio of blocked NCO groups of component (A) to $NH_2$ groups of component (B) lying between 1.3:1 and 0.75:1.

18. The protected metal part of claim 17, wherein the coating composition and a further paint layer are cured by curing together in one processing step.

19. An essentially non-aqueous heat-curable coating composition, comprising (A) a prepolymer with an average molecular weight of 500 to 15,000, which contains on the average 2 to 6 ketoxime-blocked NCO groups, which are linked via cycloaliphatic and/or aliphatic groups to the prepolymer, (B) a cross linker from the group of amines having the formula

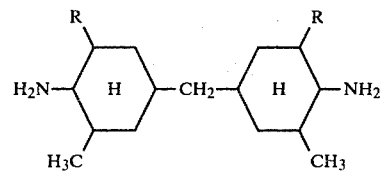 I in which R represents hydrogen or a methyl group,

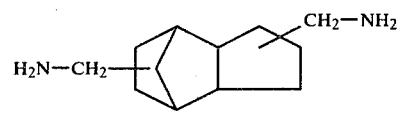 II and

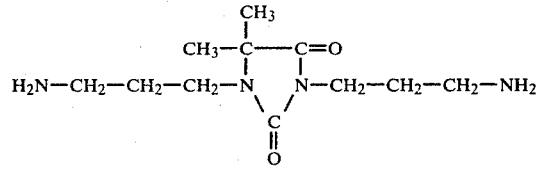 III (C) organic solvents in an amount of 0 to 50 weight percent based on the total weight of the coating composition, (D) optionally pigments, fillers, blowing agents and other known additives, the equivalent ratio of blocked NCO groups of component (A) to $NH_2$ groups of component (B) lying between 1.3:1 and 0.75:1.

* * * * *